US011250618B2

(12) United States Patent
Bradley et al.

(10) Patent No.: US 11,250,618 B2
(45) Date of Patent: Feb. 15, 2022

(54) METHOD AND SYSTEM FOR ESTIMATING THE GEOMETRY OF A SCENE

(71) Applicant: Sony Interactive Entertainment Inc., Tokyo (JP)

(72) Inventors: Timothy Bradley, London (GB); Fabio Cappello, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/075,243

(22) Filed: Oct. 20, 2020

(65) Prior Publication Data

US 2021/0125398 A1 Apr. 29, 2021

(30) Foreign Application Priority Data

Oct. 24, 2019 (GB) ...................................... 1915427

(51) Int. Cl.
*G06T 15/00* (2011.01)
*G06T 15/20* (2011.01)
(Continued)

(52) U.S. Cl.
CPC ................. *G06T 15/20* (2013.01); *G06T 7/62* (2017.01); *G06T 7/70* (2017.01); *G06T 19/006* (2013.01);
(Continued)

(58) Field of Classification Search
CPC ........... G06T 15/20; G06T 17/10; G06T 7/62; G06T 19/006; G06T 19/20
See application file for complete search history.

(56) References Cited

U.S. PATENT DOCUMENTS

2010/0298967 A1\* 11/2010 Frisken .................. G06T 17/10
700/173
2018/0336737 A1 11/2018 Varady
2020/0380316 A1\* 12/2020 Lee .......................... G06T 7/50

FOREIGN PATENT DOCUMENTS

EP 3450910 A1 3/2019
WO 2013135964 A1 9/2013
WO 2018100131 A1 6/2018

OTHER PUBLICATIONS

Combined Search and Examination Report for corresponding GB Application No. GB1915427.7, 5 pages, dated Apr. 27, 2020.
(Continued)

*Primary Examiner* — Charles Tseng
(74) *Attorney, Agent, or Firm* — Matthew B. Dernier, Esq.

(57) ABSTRACT

A method of obtaining real world scale information for a scene includes obtaining at least one image of a plurality of objects in a scene; detecting at least some of the objects in the at least one image as corresponding to pre-determined objects; generating a 3D reconstruction of the scene based on the image content of the at least one image; determining a relative size of each object in the 3D reconstruction of the scene in at least one dimension, the relative size being defined in dimensions of the generated 3D reconstruction; where the relative size of each object is determined based on a distance between at least two points corresponding to that object as transformed into 3D space; obtaining a size probability distribution function for each object detected in the at least one image, each size probability distribution function defining a range of sizes in at least one dimension that a corresponding object is likely to possess in real world units; rescaling the size probability distribution function for each detected object based on a corresponding relative size of that object in the 3D reconstruction; and estimating a geometry
(Continued)

of the scene in real world units by combining the re-scaled probability distribution function for at least one detected object with the re-scaled probability distribution function for at least one other detected object.

15 Claims, 8 Drawing Sheets

(51) Int. Cl.
    *G06T 7/62*         (2017.01)
    *G06T 7/70*         (2017.01)
    *G06T 19/00*       (2011.01)
    *G06T 19/20*       (2011.01)

(52) U.S. Cl.
    CPC .......... *G06T 19/20* (2013.01); *G06T 2200/08* (2013.01); *G06T 2219/2016* (2013.01)

(56) References Cited

OTHER PUBLICATIONS

Extended European Search Report for corresponding EP Application No. 20201820.6, 9 pages, dated Mar. 18, 2021.
Gabriele Bleser, et al., "Online Camera Pose Estimation in Partially Known dynamic Scenes" Department of Virtual and Augmented Reality, IEEE/ACM International Symposium, pp. 56-65, Oct. 22, 2006.

* cited by examiner

Male

700

Desk

701

Painting

702

METHOD AND SYSTEM FOR ESTIMATING THE GEOMETRY OF A SCENE

BACKGROUND OF THE INVENTION

Field of the Invention

The present disclosure relates to a method and system for estimating the geometry of a scene in real world units from images of the scene.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is known in the art that the real world size of an object can be estimated from the appearance of the object in captured images. This may be a more convenient means for measuring the dimensions of an object where a person does not have immediate access to e.g. a ruler or measuring tape. Presently, most people carry a smartphone with them and can usually obtain images of objects in their vicinity.

The estimate of the dimensions of an object may be used for several different purposes. For example, a person may wish to get an idea of whether an item of furniture will fit in a given room, and optionally, how that item will look at a specific location within that room. It may also be that an object is to be represented in an augmented/virtual/mixed reality environment and so the real-world dimensions of that object are needed, to ensure that the object can be faithfully represented. In a yet further example, the known (real world) size of an object may be used to calibrate a camera.

Current methods for obtaining a real world size estimate for objects in a scene rely on the insertion of a calibration object into the scene, prior to capturing an image of that scene. For example, this may involve determining the length of the calibration object in the image (e.g. as pixels) as a fraction of the known length, and then determining the number of pixels per unit length. The length of the other objects in the image, as measured in pixels, can then be converted to an estimate of their real world length.

However, as will be appreciated, a person may not always be in possession of a calibration object that can be used for estimating the size of other objects in an image. Even if they do possess such an object, it may be that they intend to measure the size of an object in an image that they did not capture, and so they cannot insert their calibration object into the corresponding scene. In some cases, it may simply be that a person does not wish to pollute the capture of an image with a calibration object.

Other known methods for estimating real world scale information for a scene involve the use of pre-calibrated cameras. Such cameras enable the size of detected objects to be determined, as well as their distance from the camera(s) that captured the images. However, a person may not always be in possession of a pre-calibrated camera. Such cameras can be costly, especially where a pre-calibrated stereo camera pair is used. For stereo camera pairs, these can often become misaligned during in use and require re-calibration. Thus even when a person believes they have access to a calibrated camera, this may not necessarily be the case, and thus any scale information determined for a scene, from the images captured by such a camera will lack accuracy.

In some cases, the sizes of a plurality of pre-determined objects may be known in advance. In such cases, an object detection algorithm may be used to detect objects in the images of the scene, and the corresponding size may be read from a database. However, as will be appreciated, a scene may include a large variety of objects, with the objects themselves having a plurality of different potential sizes (depending on e.g. brand, etc.). Hence, determining the real-world size of an object in a scene may not be as straightforward as simply detecting that object in the scene. Moreover, object detection algorithms may not necessarily facilitate the measurement of other scene features, i.e. corresponding to objects that have not been recognised by the object detection algorithm.

The present invention seeks address or at least alleviate these problems.

SUMMARY OF THE INVENTION

The present disclosure is defined by the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
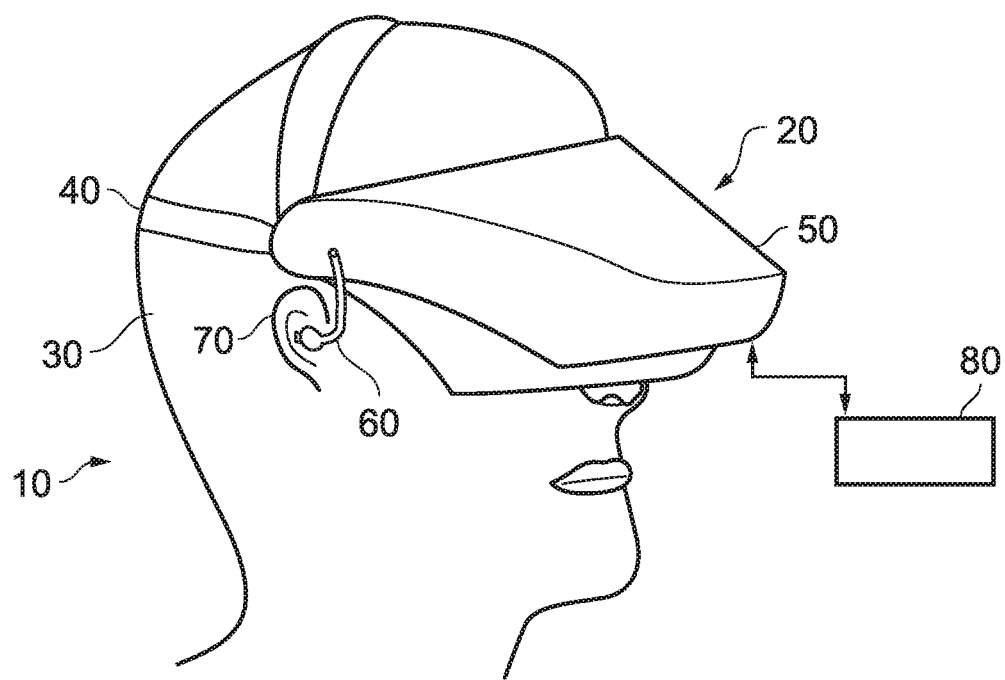
FIG. 1 shows schematically an example of a head-mountable display (HMD)

Referring now to the drawings, wherein like reference numerals designate identical or corresponding parts throughout the several views, FIG. 1 shows a user 10 wearing an HMD 20 (as an example of a generic head-mountable apparatus). The HMD comprises a frame 40, in this example formed of a rear strap and a top strap, and a display portion 50.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera (not shown) may capture images to the front of the HMD, in use. A Bluetooth® antenna (not shown) may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment.

The HMD may be used to display an augmented (AR)/virtual (VR)/mixed reality (XR) environment to a wearer of the HMD. For the augmented and mixed reality applications, at least some of the view presented to the user may correspond to the user's real world surroundings. For example, an image of a virtual object may be superimposed on top of the user's view of their real world surroundings. Mixed reality may differ from augmented reality in that the virtual object respects other real-world objects in the user's surroundings (e.g. with the relevant occlusion, interaction, etc.), whereas in augmented reality, the virtual object is arbitrarily superimposed on top of the user's real-world view. Virtual reality may correspond to the case where the viewer's real world view is entirely obscured by a graphical overlay. However, even in virtual reality, the virtual environment may correspond to a graphical reconstruction of a real world environment (or include one or more real-world objects).

In some examples, it may be desirable to insert a virtual reconstruction of a real-world object into the AR/VR/XR environment, with the dimensions of the virtual object corresponding with the dimensions of the real-world object. This may allow a user to see how the object would appear relative to other real world objects in a given environment. For example, a user may be able to view (and navigate) a virtual reconstruction of their home via the HMD and see how the virtual object would appear within that reconstruction.

In further examples, it may be desirable to generate a 3D reconstruction of a scene that corresponds to a real-world scene. For example, in virtual reality applications, it may be useful for a viewer for a user to view a reconstruction of their home, so that they can see how certain objects would look therein, or how certain modifications would look in reality.

As mentioned previously, it is generally known in the art that the size of objects in an image (in at least one dimension) can be estimated if the image contains a calibration object for which the real world size is already known. In addition, the size of objects in an image can also be estimated if the image is captured by one or more calibrated cameras. However, there may be situations in which the images do not include a calibration object and for which the user is unable to insert a calibration object into the corresponding scene. Moreover, in some cases, it may be that a user does not have access to a calibrated camera and does not have the means to calibrate the camera themselves (e.g. by not having access to a calibration object). Hence, in some situations, it may be difficult, if not impossible, for a user to obtain a size estimate for one or more objects in an image of a scene.

In the present disclosure, the term 'size' is used to refer to a measurement of at least one dimension of an object (e.g. height, width, length). Moreover, the size of an object or surface in 'real world' units corresponds to a measure of the size in metric or imperial units (e.g. metres, cm, mm; yards, feet, inches, etc.). In the present disclosure, a size is said to be 'absolute' if measured in real world units, whereas a size is 'relative' if measured in units of a 3D reconstruction, for which the relationship between real world units and 3D reconstruction units is unknown (i.e. differs by some unknown scale factor). It is an objective of the present disclosure to provide a method of determining a scale of the scene such that relative sizes (e.g. in x, y) and distances (in z), can be converted to absolute sizes/distances. A method for achieving this objective will now be described in relation to FIG. 2.

Figure 2:
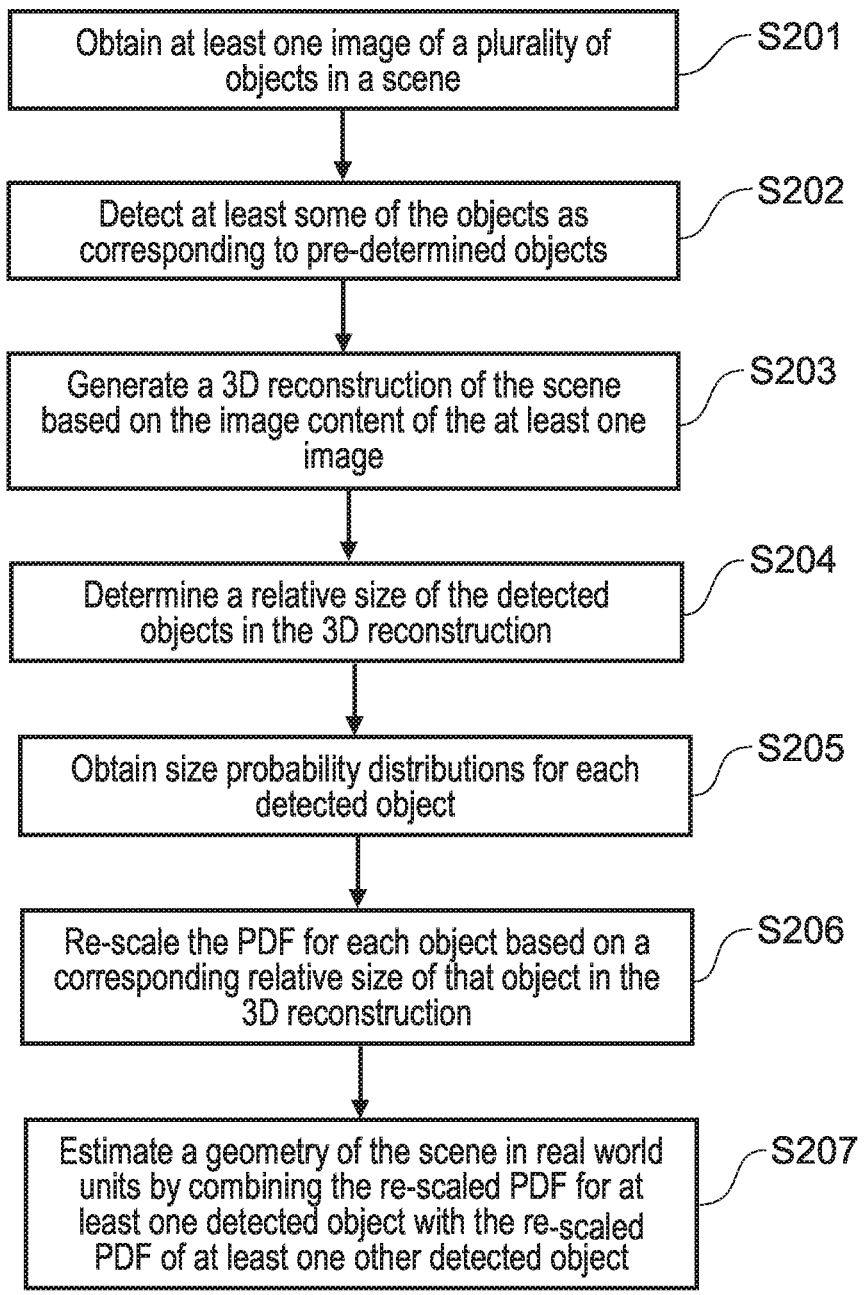
FIG. 2 shows an example of a method for obtaining a size estimate for an object based on images of the object.

In FIG. 2, at a first step S201, at least one image of a plurality of objects in a scene is obtained.

In some examples, at least two images of the plurality of objects are obtained, with each image being captured from a different respective viewpoint. The at least two images have at least partially overlapping fields of view such that there are corresponding points in the scene in the at least two images (but shown from different viewpoints). Hence, depth information can be recovered from the at least two images, although the absolute depth information will generally not be known.

The images may be captured by a single camera that is moved to a plurality of different poses (i.e. positions and/or orientations). Alternatively, at least some of the images may be captured by different respective cameras, with each camera having a different pose relative to the other cameras.

In some examples, the at least two images may be captured with a stereoscopic camera, i.e. a camera comprising two image sensors and corresponding lenses for focusing light onto the sensors. The sensors (and corresponding lenses) in the stereoscopic camera may be separated by a baseline distance, d. The stereoscopic camera need not necessarily be moved to a plurality of different poses, although this may still be desirable if e.g. an object is occluded from an initial viewpoint, or e.g. the user simply wishes to obtain more image detail for a given object. The PlayStation Camera™ is an example of a stereoscopic camera that may be used in accordance with the present disclosure.

In some examples, a combination of single cameras and stereoscopic cameras may be used. For example, a first camera may be mounted to an HMD (such as those described in relation to FIG. 1), and a second camera may correspond to a stereoscopic camera that is used to assist tracking of a user wearing the HMD.

In some examples, the at least two images are captured by at least one uncalibrated camera. A camera is said to be uncalibrated if the corresponding camera matrix is not known for that camera. The camera matrix provides a mapping between real world coordinates and image coordinates, and so enables the location of objects in a scene to be determined based on their corresponding locations in an image. The camera matrix is calculated from the intrinsic parameters (e.g. focal length, optical centre) and extrinsic parameters (rotation and translation of the camera in the camera's coordinate system, with the origin being at the camera's optical centre).

In examples where multiple different cameras are used to capture the images, the cameras may be uncalibrated in the sense that, for each respective pair of cameras, the essential matrix is not known for that pair. The essential matrix defines a mapping between corresponding pixels (i.e. representing the same point in space) between the images captured by the cameras in the pair. The essential matrix differs from the fundamental matrix in that the essential matrix describes the mapping for calibrated cameras, whereas the fundamental matrix defines the mapping for uncalibrated cameras. In examples where a single camera is moved to a plurality of different poses, the camera may be uncalibrated in that a respective essential matrix is not known for each pair of images captured from different respective viewpoints.

In some examples, step S201 may comprise obtaining at least one colour image and a corresponding depth image (each image having a substantially overlapping field of view) of a plurality of objects in a scene. The depth image may be captured by a structured light or active infra-red sensor that is not calibrated, for example.

Figure 3:
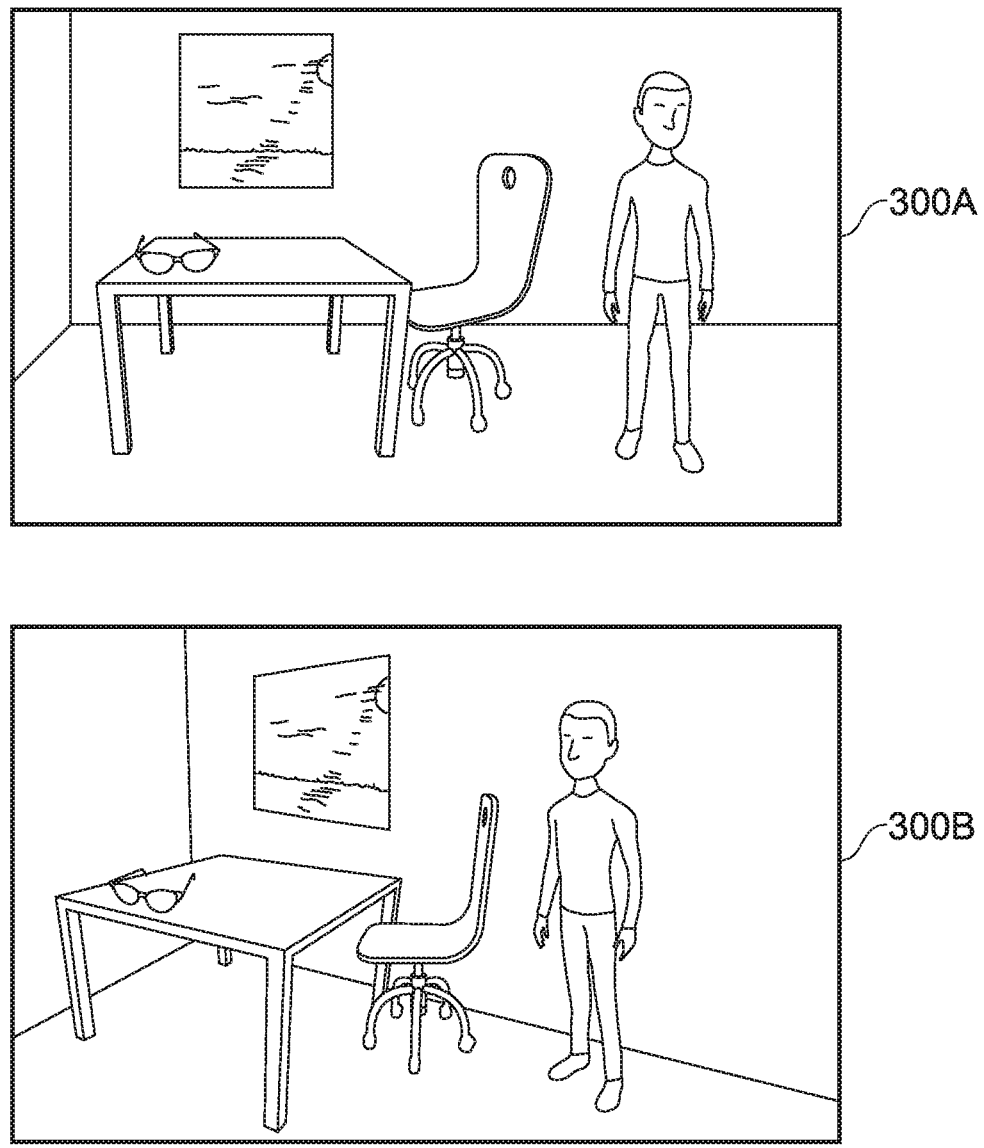
FIG. 3 shows schematically an example of two images of a scene captured from different respective viewpoints.

FIG. 3 shows schematically an example of two images 300A, 300B that may be obtained as part of step S201 in FIG. 2. In FIG. 3, first and second views of a scene are shown as images 300A and 300B respectively. The scene includes a person, desk chair, table, sunglasses and painting. The lines in the images represent the surfaces of the floor and walls of the room in which the images were captured.

In some examples of the present method, there may be a subsequent step of determining a transformation for projecting pixels in the at least one image into a 3D space.

In examples where step S201 comprises obtaining a single image of the scene, the transformation may be determined based on a machine learning model that has been trained to reconstruct 3D objects from 2D images of the objects. In such examples, the transformation for a given object may correspond to the relationship that has been learnt for a given object class (and pose) and the corresponding 3D reconstruction. An example of a model that may be used for generating 3D reconstructions from 2D images is outlined in 'Learning single-image 3D reconstruction by generative modelling of shape, pose and shading', P. Henderson, University of Edinburgh, p. 1-18 (https://arxiv.org/pdf/1901.06447.pdf), which describes the use of a generative model to predict 3D meshes of objects from corresponding 2D images of those objects. The scale of the generated 3D reconstructions may not correspond to the real-world scale of the objects in the corresponding 2D image and require re-scaling in accordance with a scale factor that is to be determined.

In other examples, where step S201 comprises obtaining at least two images of the scene, step S202 may involve determining the transformation based on corresponding image points in the at least two images. The image points may 'correspond' in the sense that they correspond to the same point in the real world, albeit captured from a different respective viewpoint. The at least two images may be rectified prior to corresponding points in the images being identified in the images.

The transformation may comprise the fundamental matrix for the at least two images. As is known in the art, the fundamental matrix is a 3×3 matrix which relates corresponding points in stereo images and may be obtained using the 8-point algorithm (or normalized version), for example. Each pair of images may be associated with a respective fundamental matrix for that image pair. The fundamental matrix enables a 3D reconstruction of the scene to be generated from the corresponding image pair, up to an unknown projective transformation, i.e. within a projective transformation of the 'true' scene. The 3D reconstruction may correspond to a point cloud of the scene.

At a second step S202, at least some of the objects in the at least one image are detected as corresponding to pre-determined objects. This may involve, for example, inputting the at least one image to an object detection algorithm. The object detection algorithm may comprise a machine learning model that has been trained (e.g. via deep learning) to identify everyday objects in images of scenes and to provide as an output, an indication of the identified objects. As will be appreciated, the object detection may involve a first step of object localization (i.e. identifying the relative locations of the objects) followed by a step of object classification (i.e. identifying what the detected objects correspond to). Examples of models that may be trained for such purposes include e.g. Region-based Convolutional Neural Networks (R-CNNs), fast R-CNNs, Faster R-CNN, You Only Look Once (YOLO), etc.

It will be appreciated that, where a single image is used for generating a reconstruction of objects in the scene, the step of detecting the objects in the image may precede the step of generating the 3D reconstruction. This is because the machine learning model may need to detect an object class associated with an object in the image, before a 3D reconstruction of that object class, for a given pose, can be generated.

In examples where step S201 involves obtaining at least two images, it may be sufficient to detect the object in one of the at least two images. However, in these examples, it may also be that objects are detected in each image.

In some examples, detecting the objects as corresponding to pre-determined objects may involve performing image segmentation, so as to identify the pixels in the images corresponding to the detected objects. Examples of image segmentation methods include thresholding, k-means algorithm, motion-based segmentation, compression-based methods, etc. In such examples, the pixels identified as corresponding to a respective object may correspond to the image points that are projected into 3D space via the transformation determined at step S202.

Figure 4:
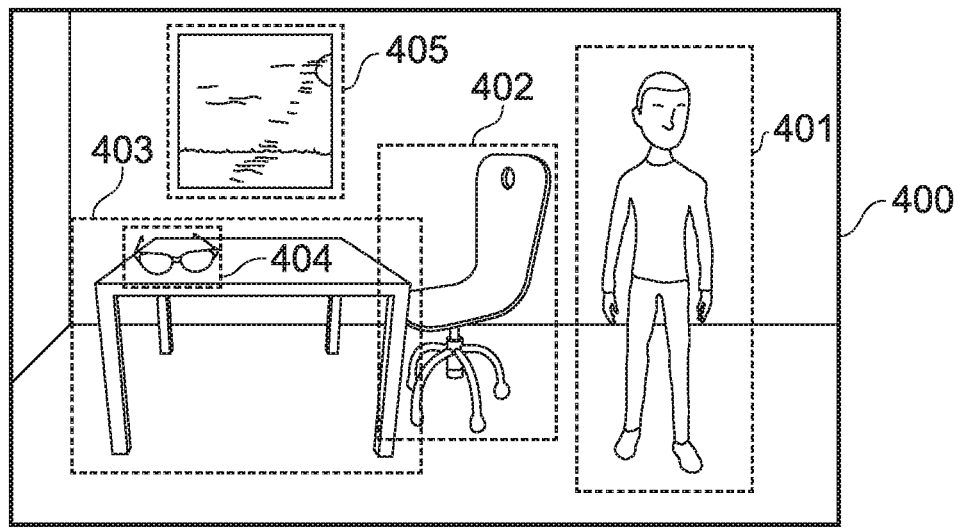
FIG. 4 shows schematically an example of an image for which a plurality of objects have been recognized by an object recognition algorithm.

FIG. 4 shows an example of an image (corresponding to image 300A) for which object detection has been performed using an object detection algorithm. In FIG. 4, each detected object is shown within a bounding box, corresponding to the location in the image that the corresponding object was detected. In FIG. 4, it can be seen that each of the person 401, desk chair 402, table 403, sunglasses 404, painting 405, is contained within a corresponding bounding box.

In the present method, there may be an additional step of detecting a plurality of points for each detected object, wherein the plurality of points for each object correspond to points on the surface of that object. This may involve, for example, detecting a plurality of key points on the surfaces of each detected object in the at least one image. For each object, a minimum of two points are detected such that at least one dimension of the object can be localized and measured. The points may be detected for each object via the use of, e.g. a Scale-Invariant Feature Transform (SIFT), Speeded-Up Robust Features (SURF) algorithm, FAST algorithm, Binary Robust Independent Elementary Features (BRIEF) algorithm, Oriented FAST and Rotated BRIEF algorithm. Alternatively, or in addition, a convolutional neural network (CNN) key point detector may be used to detect the key points, or a method based on graphical models and random forests, for example.

The key-points detected for a given object may provide an indication of a boundary of that object, such as e.g. the corners and/or edges of the table or painting in image 400. By detecting the boundary (or boundaries) associated with a given object, a relative size of that object, in at least one dimension, can be estimated. For example, by measuring the relative distance between opposing outer edges of the detected boundary.

In some examples, detecting points on the surface of an object may be equivalent to detecting a pose of the object. For human subjects, the pose may be determined using the method outlined in e.g. 'OpenPose: Realtime Multi-Person 3D Pose Estimation using Part Affinity Fields', Z. Cao et. Al, p. 1-9 (https://arxiv.org/pdf/1812.08008.pdf), which describes a method for detecting body, foot, hand and facial key points of a human subject in a 2D image. However, in other examples, the pose of the detected objects may be detected in the 3D reconstruction and not necessarily within the 2D image(s) from which the reconstruction has been generated.

In some examples, detecting a plurality of points on the surface of each detected object may involve performing image segmentation. That is, identifying the pixels that each detected object corresponds to. In such examples, the 'points' on the surface of a given object may correspond to the pixels identified as corresponding to that object. Examples of known deep networks that perform image segmentation include 'AlexNet', 'VGG-16', 'GoogleNet', 'ResNet', etc.

Figure 5:
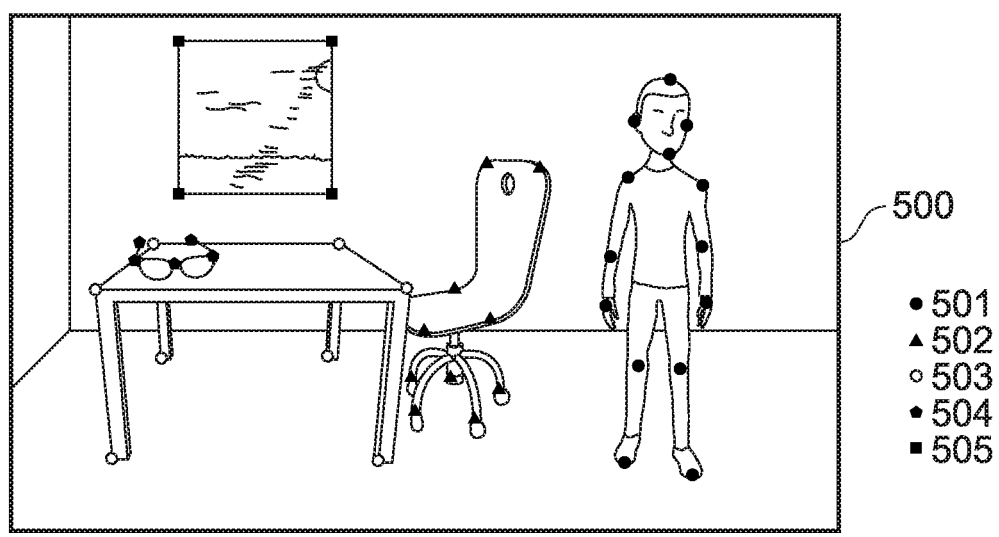
FIG. 5 shows schematically an example of a plurality of points detected for each of the objects in an image.

FIG. 5 shows schematically an example of an image (corresponding to the images 300A in FIG. 3) for which a plurality of feature-points are shown for each object. In FIG. 5, the human subject is shown as having feature points 501 (shown as black circles), the chair as having feature points 502 (shown as triangles), the table as having feature points 503 (shown as grey circles), sunglasses as having feature points 504 (shown as hexagons) and the painting as having feature points 505 (shown as squares).

Returning to FIG. 2, at a third step S203, a 3D reconstruction of the scene is generated based on the image content of the at least one image.

In some examples, this involves projecting the points detected for each object into a 3D space via a 3D transformation (described above).

In examples where step S201 involves obtaining a single image, the 3D reconstruction may be generated as described previously, i.e. using an artificial intelligence that has been trained to generate 3D meshes from 2D images of objects.

In examples where at least two images are obtained at step S201, step S205 may involve determining for each pair of images, a corresponding fundamental matrix for that pair. The fundamental matrix for a respective image pair may then be used to map corresponding image points (corresponding to the same point in space, but from a different viewpoint) to a 3D space by performing a projective reconstruction. The projective reconstruction may correspond to a point cloud of the scene that is obtained via the fundamental matrices determined for each image pair. The point cloud may be formed of the pixels that correspond to the overlapping fields of view of a respective camera pair. In other examples, it may be that only the detected feature points are reconstructed in 3D based on one or more corresponding fundamental matrices. This may be more efficient where, for example, reconstruction of an entire scene is not feasible due to limited computing resources.

Projective reconstruction refers to the computation of the structure of the scene from images taken with uncalibrated cameras, resulting in a scene structure and camera motion that may differ from the true geometry by an unknown 3D projective transformation. The 'true' geometry (i.e. measured in real world units) may then be estimated, as will be described below.

In some examples, there may be multiple image pairs that contain the same physical point in space, which is subsequently mapped into 3D via a corresponding transformation. Hence, in some examples, bundle adjustment may be used to refine the 3D coordinates of each point that is mapped into the 3D space.

At a fourth step S204, a relative size is determined for each detected object as projected into 3D space. The relative size is determined for each object based on a distance between at least two points corresponding to that object as transformed into 3D space.

As mentioned previously, in some examples, the 3D reconstruction may correspond to a point cloud of the scene, and the relative size of each object may be determined based on a measurement between points in the point cloud representing e.g. opposing edges, boundaries, corners, of that object. In such examples, there may be a step (not shown in FIG. 2) of detecting a pose of the object, such that a specific length of the object in one or more dimensions can be measured in the 3D reconstruction. It may be for example that a pose of the object is detected after the generation of the 3D reconstruction and not before.

The size, as measured in the 3D reconstruction, corresponds to a size measured in units u, which is related to a real-world size measured in real-world units x, which differs from units u by a scale factor s. That is, the real-world units, x, are related to the 3D reconstruction units, u, by the equation x=s*u. The relative size is defined in units of the 3D reconstruction, which is unlikely to correspond with the real-worlds of the 3D, physical world.

Figure 6:
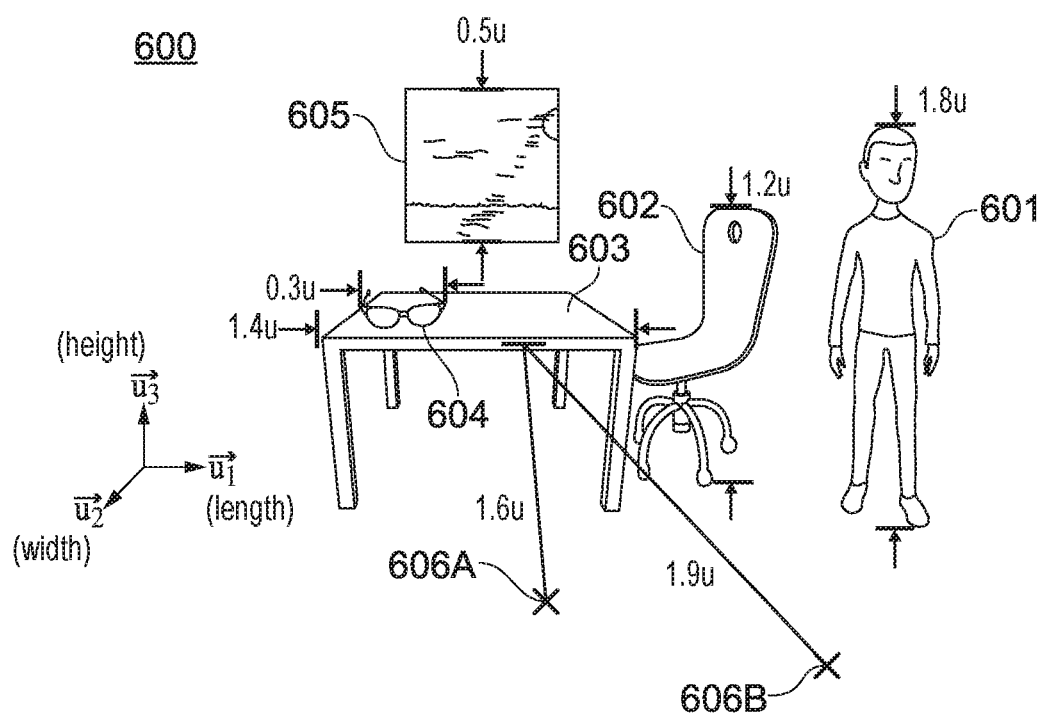
FIG. 6 shows schematically an example of a 3D reconstruction of a scene and the relative size of objects in the 3D reconstruction in one dimension.

FIG. 6 shows schematically an example of a scene that has been reconstructed in 3D in accordance with a determined transformation. The scene shown in FIG. 6 may correspond to a projective 3D reconstruction of the scene. In FIG. 6, the objects are shown at the same locations as those shown in the original image 300A, however, it will be appreciated that this may not always be the case. For example, the relative locations of each object may be skewed by some unknown amount that is to be determined. In FIG. 6, the walls and surfaces of the room are not shown, but it will be appreciated that the pixels in the images corresponding to these regions may also be reconstructed in 3D space.

In FIG. 6, the relative size of each object is shown in units of 'u'. In FIG. 6, the human subject 601 is shown as having a height 1.8 u, the desk chair 602 as having a height 1.2 u, the table 603 as having a length 1.4 u, the sunglasses 604 as having a length 0.3 u, and the painting as having a height 0.5 u. It will be appreciated that only some of the dimensions of each object are indicated so as to avoid cluttering the diagram. In reality, it may be that the relative size is determined in one, two or even three dimensions for each object. Ultimately, the ability to determine a relative size of each object in more than one dimension will depend on the amount of image data obtained for that object, and whether a boundary or feature point has been detected in a given dimension, for that object.

In FIG. 6, it can also be seen that the relative location of a first camera and second camera is indicated at positions 606A and 606B respectively. The first camera is shown as being located a distance of 1.6 u from the table 603 (front edge); the second camera is shown as being located a distance of 1.9 u from the table 603 (front. The first camera may correspond to the camera that captured the original image 300A shown in FIG. 3. The second camera may correspond to the camera that captured the image 300B shown in FIG. 3.

It would be desirable to determine the size of the objects, as well as their distance from the camera in terms of real world units. Moreover, it would be desirable to determine the distance between the cameras for each successive image, in terms of real world units. This would allow for an accurate reconstruction of the scene to be generated (i.e. a Euclidean reconstruction, with the size of objects and relative locations corresponding to their actual locations in the real-world). Moreover, it would also allow for the camera(s) that captured the images to be calibrated.

Returning to FIG. 2, at a fifth step S205, a size probability distribution function (size PDF) is obtained for each object detected in the at least two images. Each size PDF defines a range of sizes in at least one dimension that the corresponding object is likely to possess in real world units (e.g. metres, cm, millimetres, etc.). A size PDF may be obtained for each dimension of each object that is measurable in the 3D reconstruction. As mentioned above, the relative size of each object in the 3D reconstruction may be determined by determining a distance between at least two points (representing e.g. edges, corners, boundaries, etc.) representing a dimension of the object, or portion thereof, in the 3D space. Step S205 may involve obtaining a size PDF that corresponds to the size of the object, or portion thereof, as measured between corresponding points (or edges, corners, boundaries, etc.) in real world units.

The size PDF may be obtained from e.g. a database that stores size PDFs for a plurality of everyday objects (e.g. people, items of furniture, etc.). The size PDFs for everyday items may be calculated from e.g. shopping websites such as Amazon that list the sizes of a plurality of different objects. The size PDFs for human subjects may be obtained from e.g. a national database, social networks, etc. In some examples, a specific proprietary database of objects and corresponding size probability distributions may be maintained by a party.

Hence it will be appreciated that for step S302, pre-determined objects will typically be objects for which a corresponding PDF is available.

In some examples, a given object may be associated with a plurality of size PDFs—one for each dimension. Alternatively or in addition, the size PDF for a given object may be a three-dimensional plot, with e.g. the probability of a given combination of height, length and width, i.e. $P(x,y)$ where x- and y-correspond to one of the length, width and height respectively.

In some examples, it may be determined, which of the dimensions of a given object in the 3D reconstruction can be measured, and the corresponding size PDF for that dimension retrieved from the size PDF database. For example, if a scene contains an object that has been detected as corresponding to a desk chair, but the outer edges of the chair have not been detected, then it may be that the size PDF is retrieved for the height dimensions only.

In the present disclosure, the term 'size probability distribution' is used interchangeably with 'size probability distribution function' (the former may correspond to a plot of the latter). It will be appreciated that the size PDF need not necessarily be a mathematical function; for example, in some embodiments, the size PDF may correspond to a look-up table that defines the absolute sizes of objects of a particular type, in at least one dimension, such that e.g. a histogram of size vs. frequency can be determined for that dimension of the object.

Figure 7:
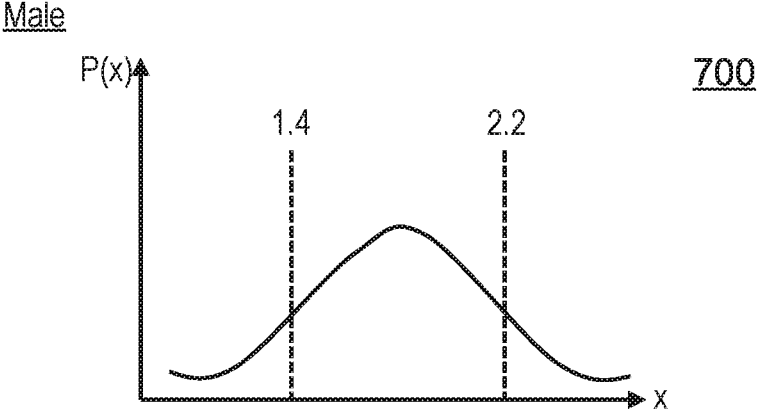
FIG. 7 shows an example of a plurality of size probability distribution functions for objects in a scene.
Figure 7:
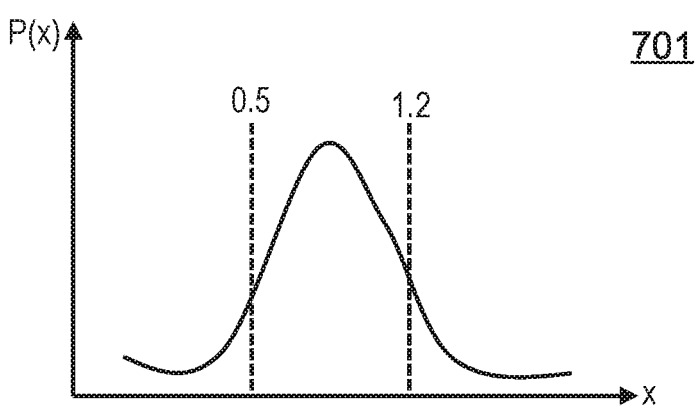
Figure 7:
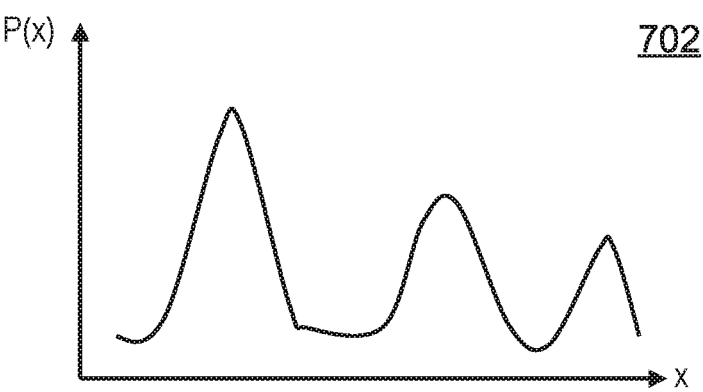

FIG. 7 shows schematically an example of different size probability distributions for different objects. In FIG. 7, the size probability distributions are shown in terms of real-world units, for example, 'x' for each distribution may correspond to a length/width/height in metres.

The first size probability distribution 700 corresponds to the size probability distribution for the height of a human male. The y-axis is labelled $P(x)$ and corresponds to the probability that a human male will have height x. In plot 700, it can be seen that the standard deviation corresponds to male humans as having an upper and lower height limit of 1.4 and 2.2 m respectively. The plot 700 may be used to convert the relative size of the human male 601 to an absolute size, as will be described later.

The second size probability distribution 701 corresponds to the size probability distribution of a desk. The plot 701 may correspond to the length of the desk, i.e. the probability that a desk will have a length x. In plot 701, it can be seen that the standard deviation corresponds to desks having an upper and lower limit of 0.5 m and 1.2 m respectively. The plot 701 may be used to convert the relative size of the desk 602 to an absolute size, as will be described later.

The probability distribution 702 corresponds to the size probability distribution of a painting. The plot 702, may correspond to the probability that a painting has a given length or height, x. As can be seen in FIG. 7, the size probability distribution has a plurality of peaks. These peaks may correspond to common heights/lengths of canvases or frames used for paintings. Although no values are shown in plot 702, it may be that the first peak corresponds to a length of e.g. 0.35 m, the second peak 0.5 m, the third peak 0.6 m and so on.

It will be appreciated that different objects have different PDFs and standard deviations; hence 'people' (or 'men' and 'women') have a broad and continuous PDF, as per plot 700, whilst the painting has a punctuated (multi-peaked) PDF with plural narrow peaks as per plot 702, due to the common picture sizes noted previously. Notably, there are everyday objects that have standardised sizes that may thus be of particular use within an image, if they are present, due to the comparatively narrow standard deviations arising in their PDFs. Examples, for different scales, include white goods such as washing machines, which are typically of a standard size, or doors, which similarly have a small number of commonly used standard sizes. At smaller scales wine bottles and CDs have predictable sizes, as do framed photographs (sizes such as 7×5, 8×6 and 10×8 inches also having distinct aspect ratios). At larger scales pylons, streetlights, buses and other street furniture typically also have a small number of standard sizes. As will be explained below, PDFs with narrow standard deviations for one or more peaks are useful (though not essential) for generating a compound probability distribution with a narrow standard deviation for a scaling factor s. Hence optionally where there is a limit imposed on the number of detected objects in the scene to be used (for example due to computational constraints) then objects having at least one real-world standard dimension may be selected preferentially, where detected.

It should be noted that, in FIG. 7, the upper and lower limit values are provided to a give a sense of scale. It will be appreciated that the plots shown in FIG. 7 are illustrative and do not necessarily correspond to real data. While only three size probability distributions are shown in FIG. 7, corresponding to a human male, desk and painting, it will be appreciated that a different number of size probability distributions may be obtained part of step S205. For example, there may be a corresponding size PDF for each dimension labelled in FIG. 6.

Returning to FIG. 2, at a sixth step, the size PDF obtained for each detected object is re-scaled based on a corresponding relative size of that object in the 3D reconstruction. This may involve dividing P(x) by the corresponding relative size of the object as measured in the 3D reconstruction. As will be appreciated, the relative size is 'corresponding' in the sense that it corresponds to the size as measured along the same dimension, albeit differing by some unknown scale inherit to the 3D reconstruction.

As mentioned above, the size of an object measured in absolute units x, is related to the relative size measured in units u, by a scale factor s (x=s*u). Hence, dividing the probability distribution P(x) for a given object by the relative size of that object in units u, gives the probability distribution for the scale factor s, i.e. P(x/u)=P(s). By dividing the size PDF for each object by a corresponding relative size measured for that object in at least one (corresponding) dimension, a plurality of probability distributions are obtained for the scale factor s. Assuming that each of the scale factor PDFs are independent from one another (i.e. have uncorrelated errors) an estimate of the scale factor s can be estimated by multiplying the scale factor PDFs together. That is, the scale factor, s, may be assumed to be distributed according to a compound probability distribution. By multiplying the scale factor PDFs for each measured dimension of each object together, a narrower probability distribution can be obtained with the maximum corresponding to a likely value of scale factor, s. Generally, the larger the number of re-scaled probability distributions (for a given length/height/width) that are combined, the narrower the peak of the P(s) distribution, and so the more accurate the estimate of the scale factor, s. Similarly, the narrower the standard deviations of peaks in the re-scaled probability distributions that are combined, the narrower the peak of the P(s) distribution. The scale factor, s, is a scalar, and may be obtained by multiplying the re-scaled size PDFs obtained for any dimension.

As an example, it may be that e.g. plot 700 shown for human males is divided by 1.8, such that lower and upper limits now correspond to 0.77 and 1.22 respectively. Similarly, the plot 701 for the desk may be re-scaled by dividing by 1.4, and the plot for the painting re-scaled by dividing by 0.2 This may be repeated for each object for which a corresponding size PDF has been obtained and for which a corresponding measurement is possible from the 3D reconstruction.

Returning to FIG. 2, at a seventh step S207, a geometry of the scene is determined in real world units. This involves combining the re-scaled probability distribution function for at least one detected object with the re-scaled probability distribution function for at least one other detected object. In some examples, this involves generating a superposition of probability distributions by multiplying the size PDF for a first object with the size PDF of another object. The maximum of the combined probability distributions may then be determined as corresponding to an estimate of the scale of the scene in the at least one image in real world units.

The method may comprise an additional step (not shown), of outputting an indication of the estimated real-world geometry of the scene. The indication may correspond to a numerical value indicating the size of one or more detected objects in one or more dimensions. Alternatively, the indication of the estimated real-world geometry may be provided as an annotated image, as will be described later.

Figure 8:
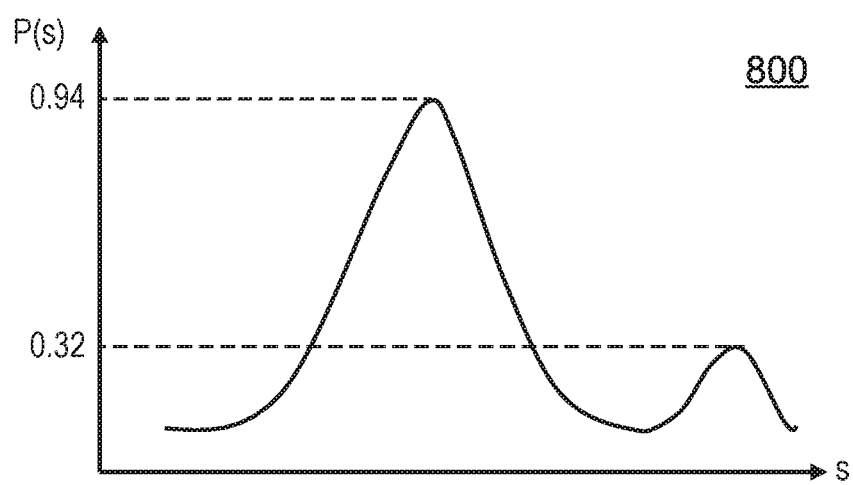
FIG. 8 shows an example of a superposition of a plurality of re-scaled size probability distribution functions.

FIG. 8 shows schematically an example of the combination of the re-scaled size probability distributions obtained for a plurality of the objects measured in FIG. 6. In FIG. 8, the combined re-scaled size probability distributions correspond to a scale factor PDF for the scene shown in FIG. 6. As can be seen in FIG. 8, the scale factor PDF peaks at a value of 0.94, which suggests that the real world units (x) are related to the units as measured in the 3D reconstruction (u) by a scale factor of 0.94. Hence, the height of the male shown in FIG. 6, in real world units may be 1.7 m (i.e. 1.8*0.94), for example.

In FIG. 8, the scale factor PDF is shown as having a second, lower, peak, which peaks at a value of 0.32. This peak may a rise from a given size probability distribution having a plurality peaks, as was the case with the painting shown in FIG. 7. Hence, the plurality of peaks may emerge in the re-scaled and combined probability distribution functions. However, it may be evident on further analysis that a given peak does not correspond to a likely value of the scale factor. For example, in FIG. 8, a scale factor of 0.32 would result in a height of the male as being 0.57 m, which would be unusual. This is reflected by the low overall value of 0.32, which incorporates the probability values for both a given size of the picture and the male being 0.57 m. Thus, such a value for the scale factor, s, can be dismissed, with typically the highest peak in the combined probability distribution being chosen as indicative of the scaling factor.

While FIG. 8 shows an example in which the scale factor can easily be determined from the combined re-scaled probability distributions for each object, it will be appreciated that in some examples, the peak of the scale factor PDF may not necessarily have such a small variance. This may be the case where, for example, the relative sizes as measured in the 3D reconstruction lack accuracy (due to e.g. a limited number of points having been detected in the images and projected into 3D space), which is subsequently carried through to the combination of re-scaled probability distributions. It may be, for example, that if the combination of the re-scaled probability distribution functions exceeds a threshold value (e.g. a threshold standard deviation), a user is prompted to capture more images of the scene (e.g. so that more image data can be obtained for the scene).

In some cases, it may also be that size probability distribution functions are only available for a limited number of detected objects, and so the combination of the re-scaled size probability distribution functions may be of limited accuracy. Conversely, the accuracy may be improved via the use of higher granularity object detection (i.e. more types of objects, and variations within a given type). For example, an object detection algorithm may be able to distinguish between different types of chairs (e.g. dining vs. desk chairs), and a size probability distribution function may be known for each type. These size PDFs may be narrower (since they relate to a specific type of object) and may therefore result in a narrower distribution for P(s) when combined with other re-scaled size PDFs. Similarly, as noted previously herein, objects with a likely standardised dimension may be used preferentially. Hence, an estimate of s with a smaller variance may be determined.

Having determined the scale factor for the scene, s, the relative size of each of the objects in the scene, as well as the distances of those objects from the camera(s), can be determined in real-world units. That is, an estimate of the real-world size of the objects, and any features measurable in the 3D reconstruction such as walls, floors, ceilings, etc. can be obtained. This may allow, for example, the measuring of objects or physical structures for which a corresponding size PDF was not obtained and re-scaled as described above. As will be appreciated, this may be useful if a user is trying to estimate whether a given object will fit in a given portion of a room.

Moreover, for each image of the scene, the corresponding pose of the camera that captured the image can be determined. This is because once the geometry of the scene can now be estimated in real world units and so the corresponding camera matrix for the camera can be determined (i.e. if the pinhole camera model is assumed, the perspective projection can be determined from the known locations of objects in the scene and the corresponding locations of those objects in images captured by a camera). Hence, the fundamental matrix may be upgraded to an essential matrix.

As mentioned previously, in some examples, each image may have been captured by an uncalibrated camera (or at least one uncalibrated camera, with some of the cameras being calibrated). The method may thus further comprise determining an essential matrix for a respective image pair for which at least one of the corresponding cameras is uncalibrated. The uncalibrated camera may then be calibrated via the essential matrix, for example, by performing a singular value decomposition (SVD) on the essential matrix, E (see: 'Multiple View Geometry in computer vision', R. Hartley and A. Zisserman (2003), Cambridge University Press, ISBN 978-0-521-54051-3, for an example calculation).

In some examples, the method may further comprise generating an image of a virtual object for display as part of at least one of an augmented, virtual and mixed reality environment. At least one of the size and position of the virtual object within the environment may correspond the size and/or position of the object in the real world (i.e. correspond with the determined real-world geometry). This may be useful where, for example, a user intends to acquire an immediate sense of scale of a real object in the scene. In such examples, the method may further comprise displaying an image of the virtual object at an HMD.

In some examples, the method may further comprise generating and displaying an annotated image of the scene. The annotated image may correspond to the original at least one image obtained at step S201 or a 2D render of the 3D reconstruction of the scene. A user may be able to select an object in the annotated image and in response thereto, be provided with real-world dimension information for that object. If the 3D reconstruction is of sufficient pixel density, a user may be able to control their viewpoint of a given object and view the corresponding real-world size information associated with one or more dimensions of that object.

In some examples, the above-described method may be used as part of an application, installed at e.g. a user's smartphone or video game console, that enables a user to insert a virtual measuring element into an image of the scene. The virtual measuring element may correspond to a 2D line or shape having a controllable length, width, height, orientation etc. that can be configured within the image of the scene (e.g. by dragging, dropping, pinching gestures, etc.). A user may configure the virtual measuring element within the scene, e.g. so as to align with one or more objects or surfaces, so as to determine the real-world dimensions of those objects or surfaces. Hence, the method may comprise: displaying an image of the scene to the user; receiving an input from the user, said input corresponding to an insertion and configuration of a virtual measuring element into the image of the scene, and displaying a real-world size of at least one dimension of the virtual measuring element (as an annotation) based on the estimated geometry of the scene in real-world units. This size estimate (or any estimate of real-world size described herein) may also be accompanied by a ±error margin based, for example, on the standard deviation of the combined probability distribution used to determine the scale factor s. The image of the scene may correspond to one of the images used to perform the scale estimation, or an image of the scene that is currently being captured (e.g. as video).

In some examples, a computer readable medium having computer executable instructions is adapted to cause a computer system to perform any of the previously described method steps.

Figure 9:
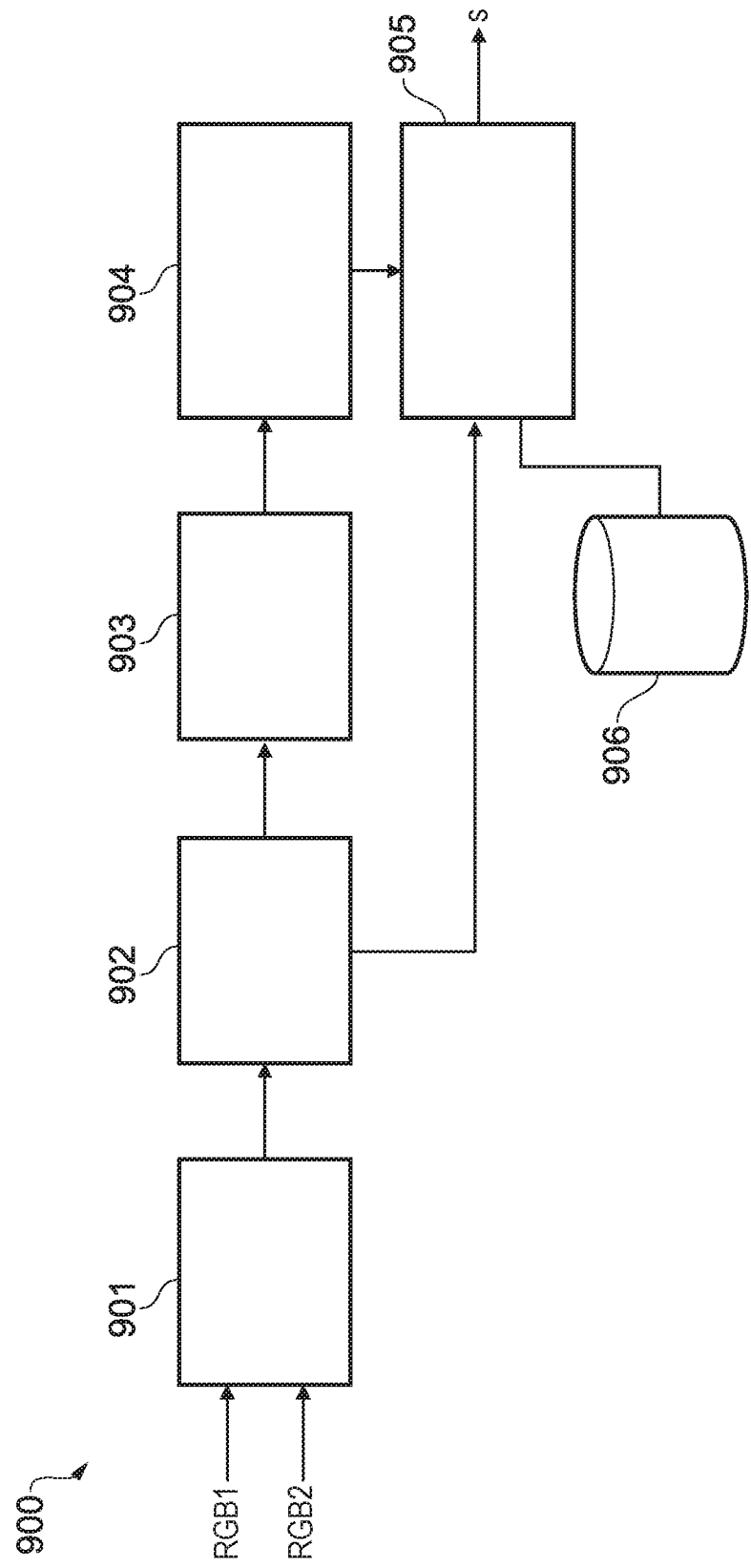
FIG. 9 shows schematically an example of a system for obtaining size estimates for objects in an image.

FIG. 9 shows schematically an example of a system 900 for determining a scale of a scene in accordance with the present disclosure. The system comprises an input unit 901, object detector 902, projection unit 903, relative size processor 904 and a scale processor 905. Generally, the system 900 is configured to perform any of the method steps described in relation to FIGS. 2 to 8.

The input unit 901 is operable to obtain at least one image of a plurality of objects in a scene. In some examples, the input unit 901 is operable to obtain at least two images of a plurality of objects in a scene, each image corresponding to a different viewpoint of the plurality of objects. The images obtained at the input unit 901 may correspond to any of the previously described images, captured in the previously described manners (i.e. in relation to step S201 of FIG. 2). In FIG. 9, two RGB images, RGB1 and RGB2 are shown as inputs to the input unit 901.

The object detector 902 is configured to detect at least some of the objects in the at least one image as corresponding pre-determined objects. The object detector 902 may comprise a deep learning model that has been trained to identify everyday objects in images. The object detector 902 may detect the objects in any of the previously described manners (i.e. in relation to step S202 of FIG. 2). In FIG. 9, the object detector 902 is shown as receiving an input from the input unit 901. This input may include e.g. the RGB1 and/or the RGB2 images received at the input unit 901.

In some examples, the system may comprise a surface point detector. The surface point detector may be configured to detect a plurality of points on a surface of each detected object in the at least one image. The surface point detector may be configured to detect one or more of: key points, edges, corners, boundaries for each of the objects detected by the object detector 902. The key points, edges, corners, boundaries may be detected by any suitable algorithm, such as those described previously.

The surface point detect may be configured to receive an input from the object detector 902 indicating a region within the images for which a given object has been detected. The surface point detector may further receive the image(s) received at the input unit 901, so as to identify a plurality of points defining a pose of each detected object. Generally, the object detector 902 is configured to detect a type of object that each object in the scene corresponds to, so that a corresponding size probability distribution can be obtained. Whereas, the surface point detector is configured to detect a plurality points on a surface of an object that can be reconstructed in 3D space, such that a relative size of the object can be determined in the 3D reconstruction. In some examples, the object detector 902 and surface point detector may operate independently, without the surface point detector needing to receive an input from the object detector 902.

The points detected by the surface point detector need not necessarily correspond to the extremities of an object. For example, looking at FIG. 6, it may be still be useful to detect keypoints corresponding to the elbow and hand of a person, even if e.g. key points corresponding to the foot and top of head cannot be detected. It may be, for example, that a given object is associated with a plurality of size probability distributions, with each size probability distributions corresponding to a length/width/height of a sub-component of that object. For example, for a car, it may be that there is a size PDF (in each dimension) for the windows, wing mirrors, doors, tyres, etc. and so key points corresponding to any one of these may be useful for estimating a scale factor for the scene.

The system further comprises a projection unit 903 configured to generate a 3D reconstruction of the scene based on the image content of the at least one image obtained by the input unit 901.

In some examples, the projection unit 903 may be configured to generate a 3D mesh of the objects detected in the at least one image (as described previously, using e.g a generative model).

In other examples, where at least two images are input to the input unit 901 (as shown in FIG. 9) the projection unit 903 may be configured to determine a transformation for generating the 3D reconstruction by determining a fundamental matrix for each respective image pair. The fundamental matrix may be determined based on corresponding image points in each respective image pair, using e.g. the 8-point algorithm. The projection unit 903 may be configured to generate the 3D reconstruction via the fundamental matrices determined for the respective image pairs. Generally, the 3D reconstruction may be generated in any of the previously described manners.

In some examples, the projection unit 903 is configured to generate a point cloud of the scene based on the regions in the at least two images corresponding to the region of overlap in the field of view. In such examples, the system may comprise an object pose detector that is operable to detect a pose of at least some of the objects as reconstructed in the point cloud. The relative size processor 905 may then be configured to determine a relative size of at least some of the objects in the point cloud based on the corresponding detected poses. Hence, in FIG. 9, the surface point detector may be replaced or supplemented with the object pose detector.

The system further comprises a relative size processor 905 configured to determine a relative size of each object in the 3D reconstruction based on a distance between points corresponding to that object in the 3D reconstruction. The relative size processor 905 may be configured to determine the size of the detected objects in the 3D reconstruction in any of the manners described previously in relation to step S204 of FIG. 2. In FIG. 9, the relative size processor 905 is shown as receiving an input from the projection unit 903. The input may correspond to e.g. a point cloud of the scene that has been generated by the projection unit 903.

The system further comprises a scale processor 905 configured to obtain a plurality of size PDFs, each size PDF defining a range of sizes in at least one dimension that a detected object is likely to possess in real world units. In FIG. 9, the scale processor 905 is shown as being in communication with a database 906 at which a plurality of size PDFs are stored. The size PDFs may correspond to, and be obtained, in any of the previously described manners. FIG. 7 shows an example of a plurality of size PDFs that may be obtained for the scene shown in FIG. 6.

In FIG. 9, the scale processor 905 is shown as receiving an input from the object detector 902 since the scale processor 905 will need to identify a size PDF that corresponds with the detected object. In some examples, the scale processor 905 may receive inputs from both the relative size processor 905 and the object detector 902, e.g. where a size PDF is to be obtained for a specific detected object, and a specific dimension of the object that can be measured in the 3D reconstruction of the scene.

The scale processor 905 is configured to re-scale the size PDF obtained for each detected object based on a corresponding relative size of that object in the 3D reconstruction, and determine a geometry of the scene in real world units based on a superposition of the re-scaled size probability distribution function for at least one object with the re-scaled probability distribution function of at least one other object. The re-scaling and superposition may be performed as described previously in relation to steps S206 and S207 of FIG. 2.

In some examples, the scale processor 905 is configured to convert the fundamental matrix to an essential matrix based on the estimated geometry of the scene.

In some examples, the input unit 901 is operable to obtain at least one image from an uncalibrated camera. In such examples, the scale processor 905 is configured to transmit the estimate of the real world geometry to the uncalibrated camera, so as to enable the uncalibrated camera to be calibrated. The system may comprise the camera that is to be calibrated. That is, the system may further comprise a camera operable to receive an input from the scale processor 905, and in response thereto, perform a calibration operation. The camera may correspond to e.g. a smartphone camera, HMD camera (e.g. where outside-in tracking is used), stereoscopic camera, such as the PS Camera™, etc.

In some examples, the system further comprises a display for displaying images. The display may be operable to receive an input from the scale processor 905, and in response thereto, display an indication of the determined geometry of the scene in real-world units. This may involve, for example displaying a numerical value indicating the length/height/width/distance in real world units, in association with an identifier for that object (e.g. the object name), and/or at a location on the display corresponding with the location of the object in an image displayed at the display. The image displayed at the display may correspond to one of the images obtained by the input unit 901, for example.

In yet further examples, the system may comprise a virtual object generator operable to generate an image of a virtual object for display as part of at least one of an augmented, virtual and mixed reality. The virtual object generator may be configured to receive an input from the scale processor 905 and projection unit 903, and in response thereto, generate a virtual version of an object detected in the at least one image with dimensions that correspond with the geometry of the scene as estimated by the scale processor 905. The virtual object may be displayed at e.g. an HMD and appear to have dimensions and/or a position that corresponds with the position of the corresponding real world object in the real world scene.

In some examples, the system may further comprise a user input module operable to receive a user input, and a virtual element generator operable to generate a virtual element for measuring objects in an image of a scene. The dimensions and orientation of the virtual element may be controllable based on the user input received at the virtual element generator. The virtual element generator may be operable to determine a dimension of the virtual element in real world elements based on an input from the scale processor 905. In such examples, the system may comprise a display for displaying the virtual element superimpose on top of an image or video the scene, with at least one of the dimensions of the virtual element also being displayed.

It will be appreciated that the above described components of the system may be implemented at or distributed across different devices. For example, it may be that the object detector and/or projection unit are located at a server, since these operations may be relatively intensive in terms of computing power. The scale processor may operate at e.g. a client device, with the relative sizes and corresponding size PDFs being processed at the client device.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The following numbered clauses describe matter that may be combined as indicated with the claims:

Clause 1. A method according to claim 2, wherein the transformation comprises a fundamental matrix associated with the at least two images.

Clause 2. A method according to any of claims 1 to 6, comprising outputting an indication of the estimated geometry of the scene in real world units at a display.

Clause 3. A method according to clause 2, comprising:
  displaying an image of the scene to the user;
  receiving an input from the user, said input corresponding to an insertion and configuration of a virtual measuring element into the image of the scene; and
  displaying a real-world size of at least one dimension of the virtual measuring element based on the estimated geometry of the scene in real-world units.

Clause 4. A system according to claim 11, wherein the scale processor is configured to convert the fundamental matrix to an essential matrix based on the estimated geometry of the scene.

Clause 5. A system according to any of claims 10 to 13 or clause 4, wherein the input unit is operable to obtain at least one image from an uncalibrated camera; and
  wherein the scale processor is operable to transmit the estimate of the real world scene geometry to the uncalibrated camera, so as to enable the uncalibrated camera to be calibrated.

Clause 6. A system according to clause 5, further comprising:
  a camera operable to receive an input from the scale processor, and in response thereto, perform a calibration operation.

Clause 7. A system according to any of claims 10 to 14 or clauses 4 to 6, wherein the system further comprises a display for displaying images; and
  wherein the display is operable to receive an input from the scale processor, and in response thereto, display an indication of the determined geometry of the scene in real-world units.

Clause 8. A system according to clause 7, further comprising a virtual object generator operable to generate an image of a virtual object for display as part of at least one of an augmented, virtual and mixed reality; and wherein the virtual object generator is configured to receive an input from the scale processor and projection unit, and in response thereto, generate a virtual version of an object detected in the at least one image with dimensions that correspond with the geometry of the scene as estimated by the scale processor.

The invention claimed is:

1. A method of obtaining real world scale information for a scene, the method comprising:
   obtaining at least one image of a plurality of objects in the scene;
   detecting at least some of the plurality of objects in the at least one image as corresponding to pre-determined objects;
   generating a three-dimensional (3D) reconstruction of the scene based on image content of the at least one image;
   determining a relative size of each object in the 3D reconstruction of the scene in at least one dimension, the relative size being defined in dimensions of the 3D reconstruction of the scene;
   wherein the relative size of each object in the 3D reconstruction of the scene is determined based on a distance between at least two points corresponding to that object as transformed into 3D space;
   obtaining a size probability distribution function for each object detected in the at least one image, each size probability distribution function defining a range of sizes in at least one dimension that a corresponding object is likely to possess in real world units;
   rescaling the size probability distribution function for each detected object based on a corresponding relative size of that detected object in the 3D reconstruction of the scene;
   and estimating a geometry of the scene in real world units by combining a re-scaled probability distribution function for at least one detected object with a re-scaled probability distribution function for at least one other detected object.

2. The method according to claim 1, comprising:
   obtaining at least two images of the scene, each image being captured from a different respective viewpoint;
   detecting, for each detected object, a plurality of points in the at least one image corresponding to points on a surface of the detected objects;
   determining a transformation for generating the 3D reconstruction of the scene based on corresponding image points in the at least two images; and
   generating the 3D reconstruction of the scene by projecting the detected plurality of points for each detected object into the 3D space via the determined transformation.

3. The method according to claim 2, wherein the at least two images are captured by at least one uncalibrated camera;
   wherein the method further comprises determining an essential matrix for the at least two images based on the estimated geometry of the scene in real world units, and calibrating the at least one uncalibrated camera based on the determined essential matrix.

4. The method according to claim 1, wherein estimating the geometry of the scene in real world units comprises estimating at least one of:
   i. a size of at least one object in the scene;
   ii. a distance of at least one object relative to a camera or each camera that captured the at least one image; and
   iii. a difference in camera pose for the at least two images.

5. The method according to claim 1, wherein estimating the geometry of the scene comprises multiplying a re-scaled probability distribution function for a first detected object with a re-scaled probability distribution function for a second detected object and determining a maximum of the multiplied re-scaled probability distribution functions as corresponding to a scale factor for the scene, the scale factor defining a conversion between a dimension measured in units of the 3D reconstruction of the scene and a corresponding dimension measured in real-world units.

6. The method according to claim 1, comprising determining a pose of each detected object in the 3D reconstruction of the scene;
   wherein determining the relative size of each detected object comprises determining a distance between at least two points defining a respective pose of that detected object; and
   wherein the size probability distribution function for each detected object corresponds to the corresponding relative size of that detected object as measured between corresponding points in real world units.

7. The method according to claim 1, comprising generating an image of a virtual object for display as part of at least one of an augmented, virtual, and mixed reality environment;
   wherein at least one of a size and position of the virtual object within the at least one of the augmented, virtual, and mixed reality environment corresponds with the estimated geometry of the scene.

8. The method according to claim 1, wherein obtaining the size probability distribution function for each detected object comprises identifying a size probability distribution function from a plurality of pre-determined size probability distribution functions that corresponds with a pre-determined object corresponding to that detected object.

9. A non-transitory, computer readable medium having computer executable instructions stored thereon, which when executed by a computer system, cause the computer system to perform a method of obtaining real world scale information for a scene by carrying out actions, comprising:
   obtaining at least one image of a plurality of objects in the scene;
   detecting at least some of the plurality of objects in the at least one image as corresponding to pre-determined objects;
   generating a three-dimensional (3D) reconstruction of the scene based on image content of the at least one image;
   determining a relative size of each object in the 3D reconstruction of the scene in at least one dimension, the relative size being defined in dimensions of the 3D reconstruction of the scene;
   wherein the relative size of each object in the 3D reconstruction of the scene is determined based on a distance between at least two points corresponding to that object as transformed into 3D space;
   obtaining a size probability distribution function for each object detected in the at least one image, each size probability distribution function defining a range of sizes in at least one dimension that a corresponding object is likely to possess in real world units;
   resealing the size probability distribution function for each detected object based on a corresponding relative size of that detected object in the 3D reconstruction of the scene; and
   estimating a geometry of the scene in real world units by combining a re-scaled probability distribution function for at least one detected object with a re-scaled probability distribution function for at least one other detected object.

10. A system comprising:
an input unit operable to obtain at least one image of a plurality of objects in a scene;
an object detector operable to detect at least some of the plurality of objects in the at least one image as corresponding to respective pre-determined objects;
a projection unit configured to generate a three-dimensional (3D) reconstruction of the scene based on image content of the at least one image;
a relative size processor configured to determine a relative size of each object in the 3D reconstruction of the scene based on a distance between points corresponding to that object in the 3D reconstruction of the scene;
a scale processor configured to obtain a plurality of size probability distribution functions, each size probability distribution function defining a range of sizes in at least one dimension that a corresponding object is likely to possess in real world units;
wherein the scale processor is configured to obtain the plurality of size probability distribution functions based on an input received from the object detector; and
wherein the scale processor is configured to re-scale a size probability distribution function obtained for each detected object based on a corresponding relative size of that detected object in the 3D reconstruction of the scene, and determine a geometry of the scene in real world units based on a superposition of a re-scaled size probability distribution function for at least one detected object with a re-scaled probability distribution function of at least one other detected object.

11. The system according to claim 10, wherein the input unit is operable to obtain at least two images of the scene, each image captured from a different respective viewpoint and having at least partially overlapping fields of view; and
wherein the projection unit is configured to determine a transformation for generating the 3D reconstruction of the scene based on corresponding image points in the at least two images, the determined transformation corresponding to a fundamental matrix for the at least two images.

12. The system according to claim 11, further comprising:
a surface point detector configured to detect a plurality of points on a surface of each detected object in the at least one image; and
wherein the projection unit is configured to generate the 3D reconstruction of the scene by projecting the detected plurality of points into 3D space in accordance with the determined transformation.

13. The system according to claim 11, wherein the projection unit is configured to generate a point cloud of the scene based on regions in the at least two images corresponding to the at least partially overlapping fields of view, the system further comprising:
an object pose detector operable to detect a pose of at least some of the plurality of objects as reconstructed in the point cloud; and
wherein the relative size processor is configured to determine a relative size of the at least some of the plurality of objects in the point cloud based on corresponding detected poses.

14. The system according to claim 10, wherein the scale processor is operable to estimate the geometry of the scene by multiplying a re-scaled probability distribution function for a first detected object with a re-scaled probability distribution function for a second detected object and determine a maximum of the multiplied re-scaled probability distribution functions as corresponding to a scale factor for the scene; and
wherein the scale factor defines a conversion between a dimension measured in units of the 3D reconstruction of the scene and a corresponding dimension measured in real-world units.

15. The system according to claim 14, further comprising:
a user input module operable to receive a user input;
a virtual element generator operable to generate a virtual element for measuring objects of the plurality of objects in the at least one image of the scene, wherein dimensions and orientation of the virtual element being controllable based on the user input received at the user input module; and
wherein the virtual element generator is operable to determine a dimension of the virtual element in real world units based on an input received from the scale processor.

* * * * *